(12) United States Patent
Spraggon

(10) Patent No.: US 6,695,537 B2
(45) Date of Patent: Feb. 24, 2004

(54) PADDLE SUPPORT

(75) Inventor: John Spraggon, Northallerton (GB)

(73) Assignee: Pipeline Engineering and Supply Company Limited, Richmond (GB)

( * ) Notice: Subject to any disclaimer, the term of this patent is extended or adjusted under 35 U.S.C. 154(b) by 0 days.

(21) Appl. No.: 10/225,109

(22) Filed: Aug. 21, 2002

(65) Prior Publication Data

US 2003/0059261 A1 Mar. 27, 2003

(30) Foreign Application Priority Data

Aug. 22, 2001 (GB) .............................................. 0120348

(51) Int. Cl.$^7$ .............................. F16L 1/06; F16L 1/024; B08B 1/00
(52) U.S. Cl. .................. 405/184.4; 405/156; 15/104.16
(58) Field of Search ........................... 405/184.1, 184.2, 405/184.3, 184.4, 184, 183.5, 156, 157; 166/241.6, 241.7; 175/325.6; 15/104.061, 104.16, 21

(56) References Cited

U.S. PATENT DOCUMENTS

| | | | | |
|---|---|---|---|---|
| 784,359 A | * | 3/1905 | Stephenson | 15/104.16 |
| 2,781,100 A | * | 2/1957 | Pyle et al. | 166/173 |
| 2,972,156 A | * | 2/1961 | Ver Nooy | 15/104.061 |
| 3,619,844 A | | 11/1971 | Collins et al. | |
| 3,933,203 A | * | 1/1976 | Evans | 166/241.6 |
| 3,963,075 A | * | 6/1976 | Evans | 166/241.6 |
| 4,042,023 A | * | 8/1977 | Fox | 166/241.7 |
| RE31,016 E | * | 8/1982 | Oster | 308/4 |
| 5,600,863 A | | 2/1997 | Curran | |
| 6,102,624 A | * | 8/2000 | Delaforce | 405/184 |

FOREIGN PATENT DOCUMENTS

| | | | |
|---|---|---|---|
| DE | 19837032 A1 | 2/2000 | |
| GB | 1356460 A | 6/1974 | |
| GB | 2201176 A | * 8/1988 | E21B/17/10 |
| WO | WO 00/30773 A | 6/2000 | |

* cited by examiner

*Primary Examiner*—Heather Shackelford
*Assistant Examiner*—Lisa M. Saldano
(74) *Attorney, Agent, or Firm*—Drinker Biddle & Reath LLP

(57) ABSTRACT

The present invention provides a support sleeve for supporting an internal pipeline apparatus in a pipeline. The sleeve is provided with a number of deformable splines around its circumference which keep the pipeline apparatus centralized in the pipeline during operation. The leading edges of the splines have chamfers so that, when the sleeve encounters a reduction in the diameter of the pipeline, the splines deform in a direction transverse to the longitudinal axis of the sleeve. It this way, less force is required to move the apparatus and sleeve through a portion of pipeline of reduced diameter than is the case with conventional disc supports.

11 Claims, 4 Drawing Sheets

PADDLE SUPPORT

FIELD OF THE INVENTION

The present invention relates to a paddle support for pipelines. In particular, the invention relates to a paddle support to be mounted on a pig for use in a pipeline.

BACKGROUND OF THE INVENTION

Various deposits can accumulate on the inner surface of oil and gas pipelines such as rust, wax or dirt. Such deposits are conventionally removed using pigs, which are cylindrical or spherical capsules inserted into the pipeline to move along the pipe. The pigs are often adapted to scrape the inner surface of the pipeline as they travel, though they may be used for many other purposes such as gauging the internal bore of the pipeline or monitoring pipeline condition and integrity.

Known pigs consist of a pig body, seals and fittings. The fittings include brushes and scraper blades, and also support sleeves for centralising the pig within the pipeline. Conventional support sleeves consist of solid discs, although 'V'-shaped notches are often cut out of the circumference of the disc. This is particularly the case for use in pipelines which reduce in diameter, as the notches promote bending deformation of the support sleeve in the longitudinal direction.

The seals are conventionally solid rubber discs used to drive the pig as a pressurised fluid acts upon them. The solid seals tend to produce a large pressure upstream of the pig. By-pass ports within the pig body may be used to reduce this pressure and also provide a jetting action to improve cleaning of the pipeline.

It is often necessary to reduce the diameter of the pipeline. In such cases, dual-diameter pigs are often used. The seals of the pig, sized to match the larger internal pipe diameter must deform to fit the lesser pipe diameter. Conventionally, the seals are available in three types: disc, standard cup and conical cup, with the conical cup seal deforming best. Large forces are required to deform the support sleeve, which tends to have a greater depth than the seals.

SUMMARY OF THE INVENTION

It is an object of the present invention to provide a support which centralises a pig within a pipeline while reducing the force that is required to deform the support. It is a further object of the invention to provide a support which may easily deform when reaching a reduction in the internal diameter of the pipeline.

According to a first aspect of the invention there is provided a support sleeve for supporting an internal pipeline apparatus within a pipeline, the sleeve being adapted to be received on the pipeline apparatus and including a plurality of resiliently deformable splines extending radially outwardly from the sleeve, wherein the sleeve has a longitudinal axis and each spline is adapted to resiliently deform in a direction transverse to the longitudinal axis when a force substantially parallel to the longitudinal axis is applied to the spline.

Preferably, each spline deforms in a substantially circumferential direction about the longitudinal axis when the force is applied to the spline. Most preferably, each spline is profiled to promote buckling of the spline in the circumferential direction when the force is applied.

Preferably, each spline has a pair of leading edges, each of the leading edges being chamfered so as to promote buckling of the spline.

Preferably, each spline has a depth and a width, the depth being greater than the width.

Preferably, the splines are integrally formed on the sleeve.

Preferably, the sleeve is manufactured from a polyurethane material.

Preferably, the sleeve is substantially cylindrical and at least one end of the sleeve is open. Preferably, the splines are equidistantly spaced around the circumference of the sleeve.

According to a second aspect of the present invention, there is provided an internal pipeline apparatus comprising a body portion and a support sleeve in accordance with the first aspect of the present invention.

Preferably, the apparatus further comprises at least one annular seal mounted on the body portion.

In a preferred embodiment, the sleeve is fixedly attached to the body portion. Alternatively, the sleeve may be attached to the body portion such that it may rotate relative to the body portion.

BRIEF DESCRIPTION OF THE DRAWINGS

An embodiment of the invention will now be described, by way of example only, with reference to the accompanying figures, where.

DETAILED DESCRIPTION OF THE DRAWINGS

Figure 1:
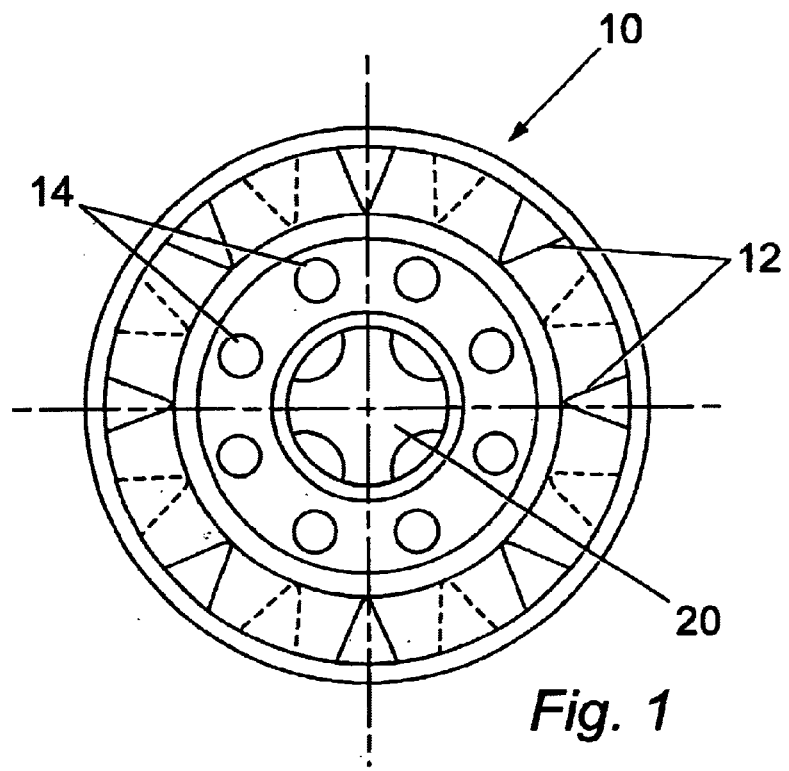
FIG. 1 is a front view of a conventional support sleeve mounted on a pig.
Figure 2:
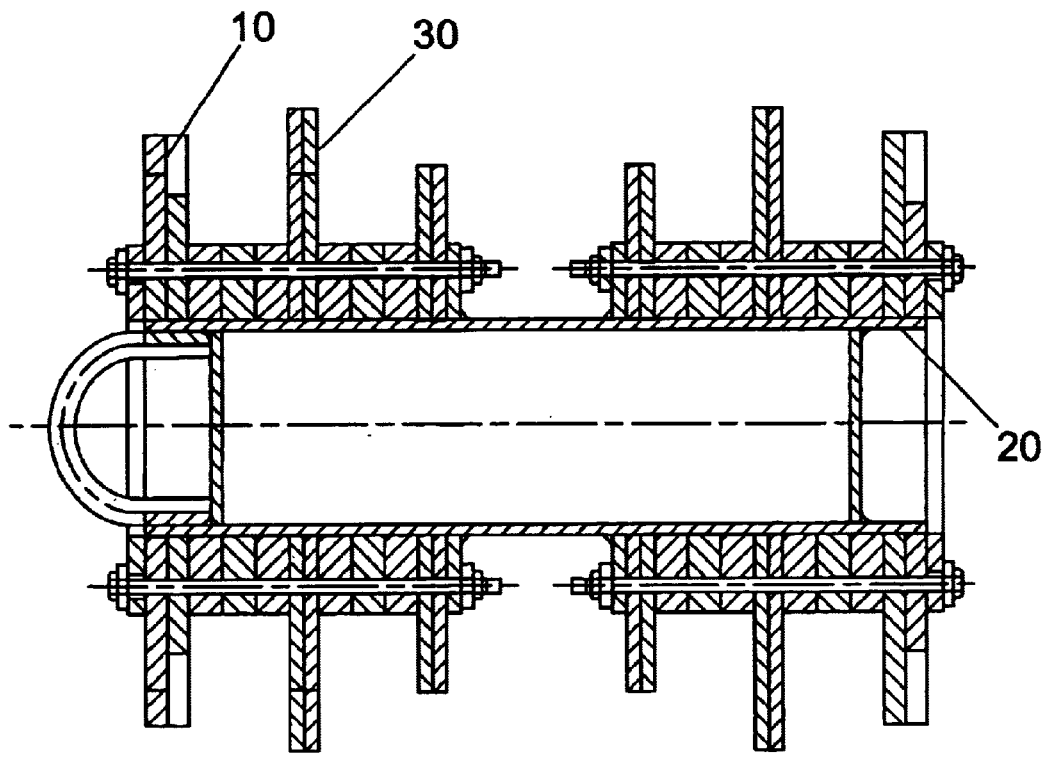
FIG. 2 is a side view of the support sleeve of FIG. 1 mounted on a pig.

FIG. 1 shows a conventional support sleeve 10 mounted on a pig 20. The sleeve 10 has a number of V-shaped slots 12 spaced equidistantly around its circumference. This promotes deformation in the longitudinal direction when the pipeline reduces in internal diameter, that is the sleeve 10 will either bend backwards or forwards relative to the pig depending upon the direction in which the pig is travelling. The sleeve 10 includes a number of apertures 14 for fixing the sleeve 10 to other components and this is shown more clearly in FIG. 2.

The other components include a sealing disc 30. The sealing disc is typically sized so that it has a diameter that is 104% of the internal diameter of the pipeline. This ensures adequate sealing between the sealing disc 30 and the inner surface of the pipeline. The support sleeve 10 is typically sized so that it has a diameter that is 99% of the internal diameter of the pipeline. Therefore the sleeve does not substantially hinder the flow of the fluid within the pipeline but serves to centralise the pig 20 within a relatively small tolerance.

Figure 3:
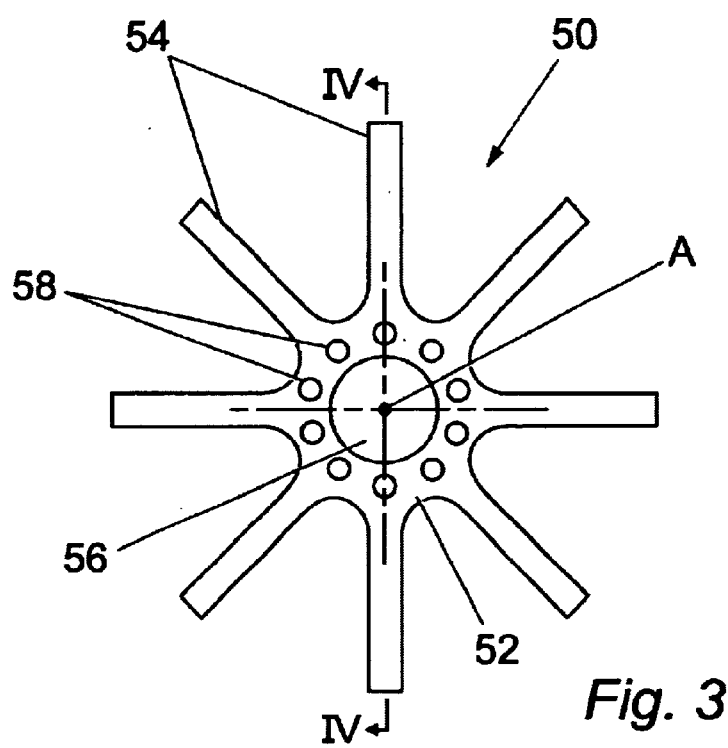
FIG. 3 is a front view of a support sleeve in accordance with the present invention.

FIG. 3 is a front view of a support sleeve, or paddle support 50, in accordance with the present invention. The paddle support 50 comprises an annular core 52 and a number of resiliently deformable splines 54 extending radially outwards from the core 52. The core 52 and splines 54 are integrally formed, having been moulded as a monolithic construction, with the splines 54 being equidistantly spaced about the circumference of the core 52. The core 52 has a longitudinal axis A and a central axial aperture 56 for mounting on to a pig body. A number of other apertures 58 are equidistantly spaced around the central aperture 56 which are used to mount the paddle support 50 to other components, such as brushes and scraper blades.

Figure 4:
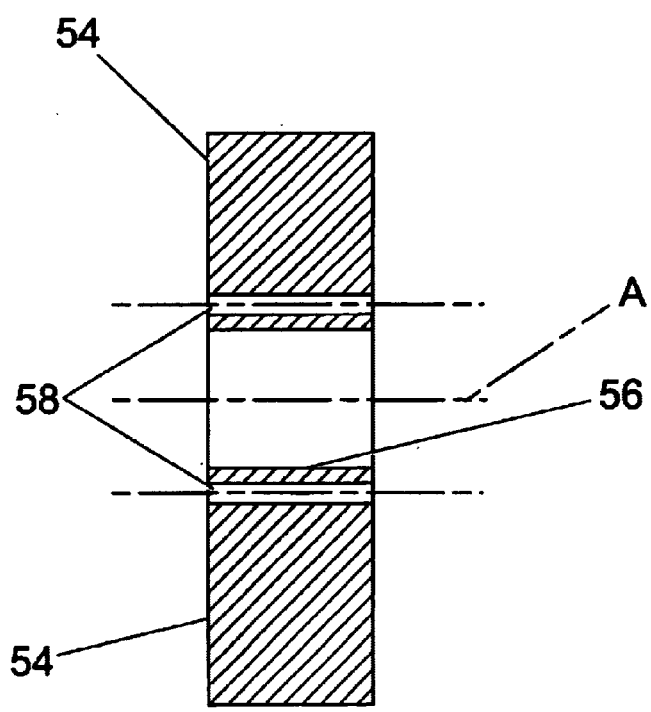
FIG. 4 is a cross-sectional view of the support sleeve of FIG. 3 along line IV—IV.

FIG. 4 is a vertical cross-section of the paddle support 50. It can be seen that the paddle support 50 has a depth which is greater than the width of the splines 54 (as shown in FIG. 3). This provides a relatively high stiffness in the longitudinal direction in comparison to the transverse direction and promotes buckling deformation in the circumferential direction about the longitudinal axis. If the material of the splines 54 is homogeneous, the higher longitudinal stiffness arises from the fact that the second moment of area of each spline 54 in the longitudinal direction is significantly greater than the second moment of area in the transverse direction.

Figure 5:
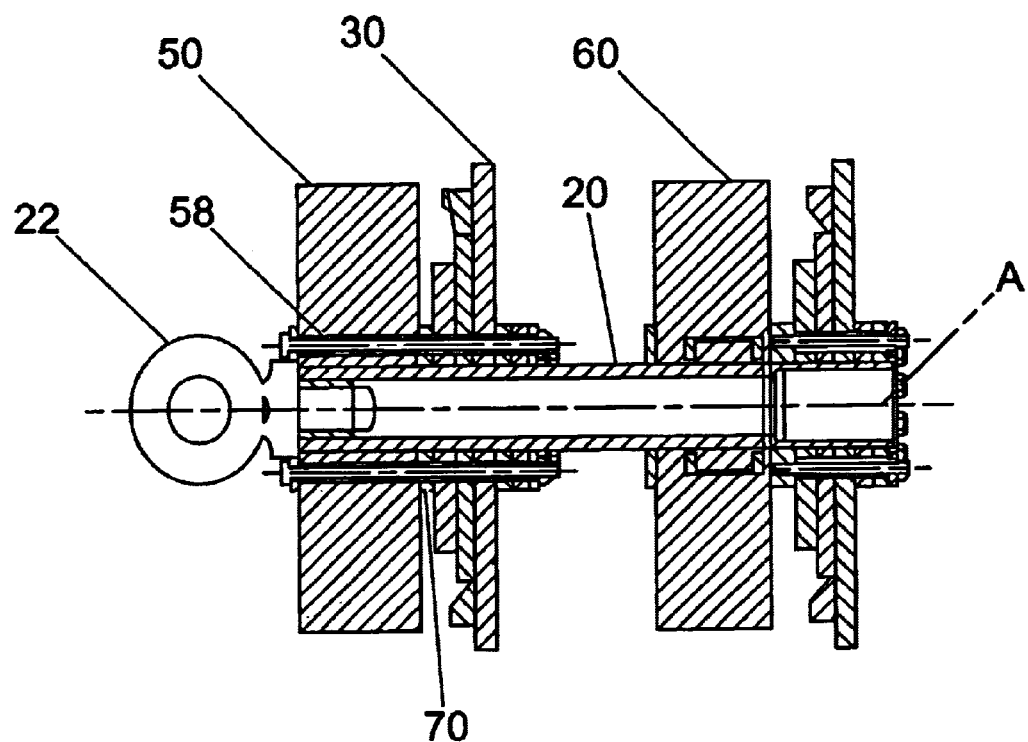
FIG. 5 is a longitudinal cross-section of the support sleeve of FIG. 3 mounted on a pig.

FIG. 5 is a vertical cross-section through two paddle supports 50, 60 mounted on a pig body 20. The first paddle support 50 is mounted to other components via the mounting apertures 58. One of these components is a clamping ring 70 and this prevents rotation of the paddle support 50. Further components shown in FIG. 5 are conventional sealing discs 30. The second paddle support 60 is a reinforced type and is rotatably mounted on the pig 20.

The pig body 20 also has a detachable frontal hook 22 which is used to retrieve the pig 20 at a recapturing zone or pig trap.

Figure 6:
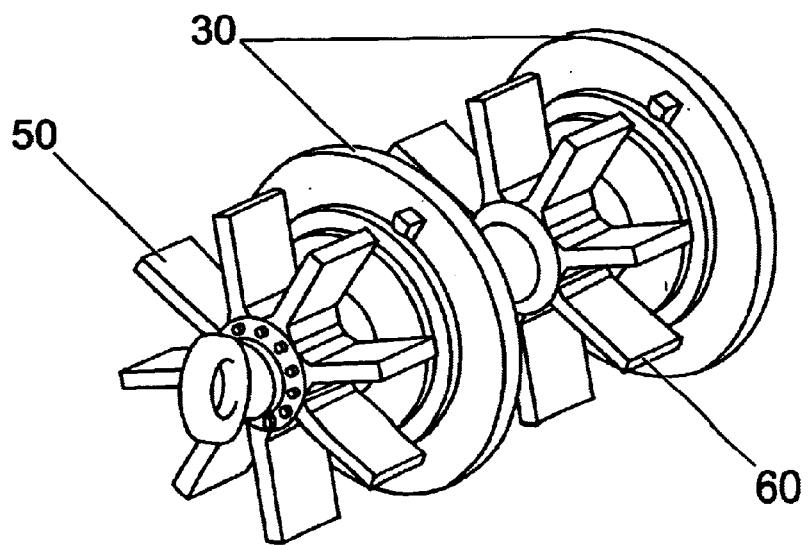
FIG. 6 is a perspective view of the support sleeve and pig of FIG. 5.

FIG. 6 shows a projected view of the two paddle supports 50, 60 mounted on a pig 20 along with the sealing discs 30.

Figure 7:
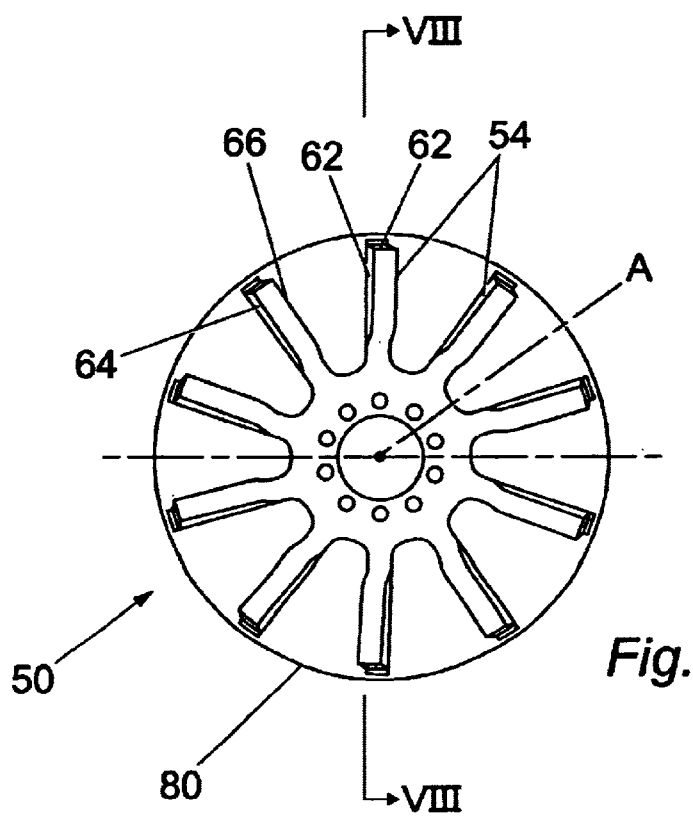
FIG. 7 is a schematic front view of a support sleeve within a pipeline having a first diameter.

FIG. 7 shows a schematic view of the paddle support 50 within a pipeline 80 of relatively large diameter. When the pig is perfectly central, no spline 54 makes contact with the internal surface of the pipeline 80. However, a small degree of translation in any radial direction causes at least one spline 54 to make contact with the pipeline 80 and this prevents further translation. Therefore, the pig remains centralised within a small tolerance of translation.

Figure 8:
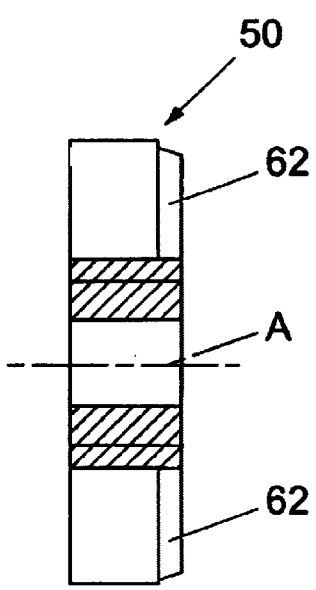
FIG. 8 is a vertical cross-sectional view of the support sleeve of FIG. 7 along line VIII—VIII.

In FIG. 7 it is shown that each spline 54 of the paddle support 50 is asymmetrically shaped, i.e., asymmetrical about a radial plane projecting from and coincident with the longitudinal axis A of the paddle support 50. Such asymmetric shaping of each spline 54 produces an asymmetric moment of area causing each spline 54 to deform in a predetermined direction under an applied load. More specifically, each of the splines 54 includes chamfers 62 at each leading edge 64, 66 so as to promote controlled circumferential deformation of the spline 54 in a predetermined direction relative to the longitudinal axis A of the paddle support 50 when a force substantially parallel to the longitudinal axis is applied to the spine 54. Furthermore, inasmuch as each spline 54 is chamfered in an identical manner, all of the splines deform in the same predetermined direction. Moreover, the chamfered leading edges 64, 66 of each spline 54 are complimentary and substantially parallel to each other. This chamfering can also be seen in FIG. 8, which is a vertical cross-section of the paddle support 50.

Figure 9:
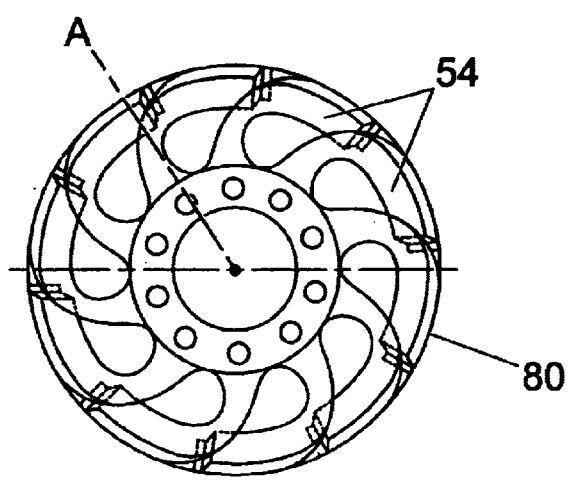
FIG. 9 is another front view of the support sleeve of FIG. 7 within a pipeline having a second, smaller diameter.

FIG. 9 shows the paddle support 50 in a deformed condition after it has met a reduction in the internal diameter of the pipeline 80. Due to the relatively large depth-to-width ratio of each spline 54, the splines 54 are prone to large out-of-plane deflections when a force is applied to the splines 54 in a direction substantially parallel to the longitudinal axis A of the support 50. Due to the particular chamfering of the leading edges of the splines 54, buckling occurs in a controlled manner: the splines 54 always buckle substantially in a circumferential direction transverse to the longitudinal axis A and in a clockwise direction.

Each spline 54 is made from a resilient material, typically polyurethane. Therefore, in a deformed state, each spline 54 exerts an equal force on the internal surface of the pipeline 80. Thus, in the deformed state, the paddle support 50 still serves to centralise the pig within the pipeline 80.

This use of controlled buckling significantly reduces the force required to deform the splines 54 and therefore alter the paddle support 50 so that it may adapt to a reduction in the pipeline diameter.

Various modifications and improvements can be made without departing from the scope of the present invention. For example, the chamfering of each spline may be such as to promote buckling in an anti-clockwise manner when a longitudinal force is applied. Alternatively, the profiling of each spline may such as to promote twisting of the spline to achieve circumferential translation of the spline. The splines and/or the core may be made from any resilient material other than polyurethane.

What is claimed is:

1. A support sleeve for supporting an internal pipeline apparatus within a pipeline, the sleeve being adapted to be received on the pipeline apparatus comprising:

a plurality of resiliently deformable splines extending radially outwardly from the sleeve, each spline having at least one leading edge, wherein the sleeve has a longitudinal axis and each spline is shaped asymmetrically about a radial plane biscecting each spline along their radial length, and said at least one leading edge is chamfered to resiliently deform in a predetermined circumferential direction to the longitudinal axis when a force substantially parallel to the longitudinal axis is applied to the spline.

2. The sleeve of claim 1, wherein each spline has a pair of leading edges, each of the leading edges being chamfered such that the spline is shaped asymmetrically.

3. The sleeve of claim 1, wherein each spline has a depth and a width, the depth being greater than the width.

4. The sleeve of claim 1, wherein the splines are integrally formed on the sleeve.

5. The sleeve of claim 1, wherein the sleeve is manufactured from a polyurethane material.

6. The sleeve of claim 1, wherein the sleeve is substantially cylindrical.

7. The sleeve of claim 6, wherein the splines are equidistantly spaced around the circumference of the sleeve.

8. An internal pipeline apparatus comprising:

a body portion; and a support sleeve for supporting the internal pipeline apparatus within a pipeline, the sleeve being adapted to be received on the pipeline apparatus and including a plurality of resiliently deformable splines extending radially outwardly from the sleeve, each spline having at least one leading edge, wherein the sleeve has a longitudinal axis and each spline is shaped as asymmetrically about a radial plane bisecting each spline along their radial length, and said at least one leading edge is chamfered to resiliently deform in a predetermined circumferential direction transverse to the longitudinal axis when a force substantially parallel to the longitudinal axis is applied to the spline.

9. The apparatus of claim 8, further comprising at least one annular seal mounted on the body portion.

10. The apparatus of claim 8, wherein the sleeve is fixedly attached to the body portion.

11. The apparatus of claim 8, wherein the sleeve is attached to the body portion such that it may rotate relative to the body portion.

* * * * *